July 6, 1943.  C. S. WEYANDT  2,323,864
VIBRATORY FEEDER
Filed May 1, 1939  6 Sheets-Sheet 1

July 6, 1943.

C. S. WEYANDT 2,323,864

VIBRATORY FEEDER

Filed May 1, 1939

Inventor
Carl S. Weyandt
by Lewis D. Konigsford
Attorney

July 6, 1943. C. S. WEYANDT 2,323,864
VIBRATORY FEEDER
Filed May 1, 1939 6 Sheets-Sheet 3

Inventor
Carl S. Weyandt
by Lewis D. Konigsford
Attorney

July 6, 1943.  C. S. WEYANDT  2,323,864
VIBRATORY FEEDER
Filed May 1, 1939  6 Sheets-Sheet 4

Inventor
Carl S. Weyandt
by Lewis D. Konigsford
Attorney

July 6, 1943.  C. S. WEYANDT  2,323,864
VIBRATORY FEEDER
Filed May 1, 1939  6 Sheets-Sheet 6

INVENTOR.
Carl S. Weyandt.
BY Lewis D. Konigsford
ATTORNEY.

Patented July 6, 1943

2,323,864

UNITED STATES PATENT OFFICE 2,323,864

VIBRATORY FEEDER

Carl S. Weyandt, Homer City, Pa.

Application May 1, 1939, Serial No. 270,999

7 Claims. (Cl. 221—118)

This invention relates to the art of conveying or handling non-mobile or semi-mobile materials, such as pastes, powders, sand, gravel, and the like, and relates in particular to apparatus for feeding the same in a controlled or regulated movement.

According to the present invention a conveyor trough or chute is mounted to vibrate with a conveying action, and a hopper or bin is provided for discharging materials into the trough, the discharge mouth of the hopper being in such proximity to the trough that the accumulation of material on the trough retards the flow of material from the hopper. The vibratory conveyor thus acts as a vibratory gate to control the discharge from the hopper. The feed opening provided between the hopper and conveyor may be adjusted as desired by relative positioning of the hopper and conveyor.

In order to secure a greater degree of uniformity of flow, I vibrate the hopper walls to maintain the material therein in a state of flux, the preferred type of hopper employed being in the form of a cone, preferably built up of two half sections and having substantially non-angular walls. I prefer to utilize a self contained electromagnetically reciprocated or vibrated type of vibrator for vibrating the hopper, as such a vibrator is relatively noiseless and maintains the hopper walls in constant and substantially uniform vibration adjacent the apex of the hopper.

I have further found that when the conveyor is adjusted to a very slow rate of feed it is important to vibrate the hopper walls at the correct amount, depending on the character of the material and on other factors, to prevent bridging of the material or packing of the material in the hopper, as at the slower rates of discharge of material from the hopper the material therein is more liable to form a bridge or clog in the hopper. It is, therefore, a further feature of my invention to provide independent control of the vibration of the hopper and of the conveyor, and in the preferred embodiment the vibrations of the conveyor and the hopper vibrations are insulated from each other by suitable vibration absorbers.

The reciprocatory motor herein described and a conveyor operated thereby form the subject matter of my application Serial No. 106,851, filed October 21, 1936, for Vibratory electrical apparatus, issued as Patent No. 2,187,717 on January 23, 1940, of which the present application is in part a continuation.

As a further feature of the invention I may employ a unidirectional pulsating current to operate the vibrator and the conveyor, one half wave of the alternating current source being utilized to operate the vibrator and the other half wave being utilized to operate the conveyor.

Accordingly, it is an object of the present invention to provide novel apparatus for feeding, handling or conveying non-fluid materials at a controlled or uniform rate, which may be varied through a wide range.

Another object is the provision of an apparatus for feeding materials from a hopper whereby the rate of feed may be controlled or changed by adjusting the hopper and conveyor relative to each other.

A further object is the provision of a material conveying or feeding machine that is universal in character and may be employed for feeding or conveying a wide variety of materials.

Another object is the provision of an apparatus for feeding materials in which the material is kept in a state of agitation throughout its course.

Another object is the provision of a feeding apparatus which will not become clogged by oversize material.

Another object is the provision of feeding apparatus comprising a hopper for feeding material to a reciprocatory conveyor and in which the vibration of the hopper may be adjusted separately and independently of the vibration of the conveyor.

These and other objects will be apparent from a consideration of the following specification taken in connection with the accompanying drawings wherein:

Figure 7 is an end elevation view on an enlarged scale of a preferred type of vibratory member;

Figure 8 is an elevation view of a detail of the hopper adjustment shown in Figure 1;

Figure 9 is an end view of the hopper adjustment handle shown in Figure 1;

Figure 10 is an end view with the casing in section of a preferred hopper vibrator;

Figure 11 is a side view partly in section of the vibrator shown in Figure 10;

Figure 16 is an electrical wiring diagram with certain parts schematically shown for operating the embodiment of Figures 1 and 2 continuously or intermittently.

Figure 1:
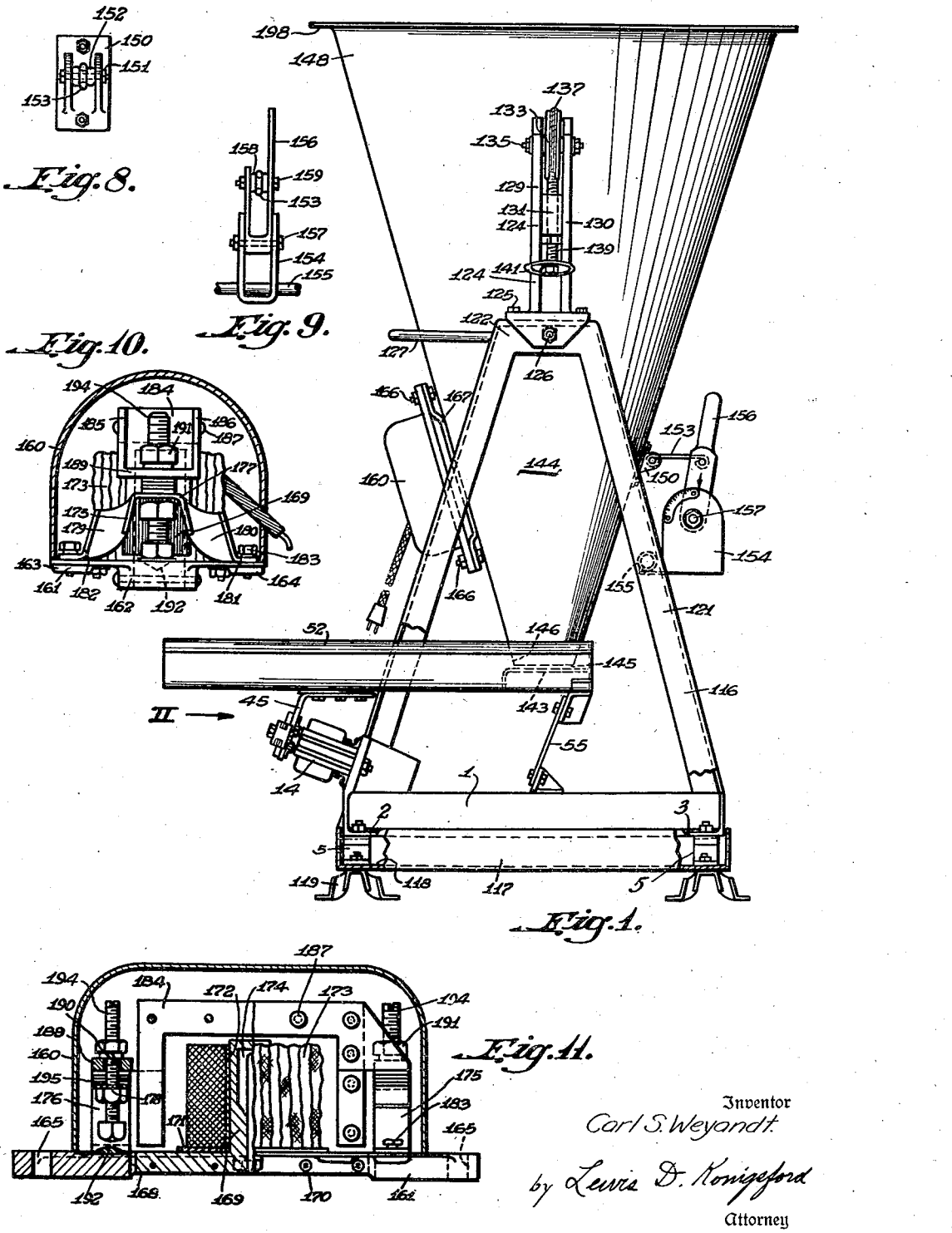
Figure 1 is a side elevation view of a preferred embodiment of my invention.

Referring to the drawings, the numeral 1 designates a base of any suitable construction, which as shown, is of inverted channel shape, and has horizontal flanges 2 and 3 at its ends. The base preferably is made massive and is bolted or otherwise secured to suitable resilient vibration elements 5 which rest on the floor. The vibration members 5 (Figure 7) each comprise an inverted channel strip 6 with a hole 7 bored or punched therethrough, and having rubber pads 8 and 9 vulcanized or otherwise secured thereto on one of their faces respectively, and their period of vibration may be determined by suitable selection of their width. To the opposite faces are secured angle plates 10 and 11 having holes 12 formed therein. The base 1 is secured to the channel strip 6 by bolts 13.

An electromagnet assembly comprises a core 14 in the shape of an E built up of laminated steel plates located between two angle bars 15 and 16, and rivets 17 pass through the bars 15 and 16 and through the plates of magnet core 14 to hold them in assembled relation. Two brackets or plates 18 and 19 having the reenforcing flanges 20 thereon are formed integral with the base 1, and the magnet core 14 is secured to the plates 18 and 19 in spaced relation thereto by bolts 21 passing through the angle bars 15 and 16 and threaded into these brackets, a spacing plate 22 being interposed therebetween. A coil 23 of wire surrounds the middle leg of the magnet core and is secured in position by suitable clips 24 passing through the angle plates 25 which may be welded or otherwise secured to angle bars 15 and 16, a resilient pad 26 of rubber or other suitable material being interposed between the coil and magnet base.

At the ends of the electromagnet two hexagonal side bars 27 and 28 of non-magnetic material such as non-magnetic stainless steel, are bolted to the brackets 18 and 19 by nuts 29 threaded onto the reduced lower ends of the bars. The upper ends of bars 27 and 28 are reduced and threaded at their upper ends to receive adjusting nuts 30 and 31 thereon, and the spring supports 32 and 33 have holes therein through which pass the reduced threaded ends of the side bars. The spring support 32 is adjustably held in position on nut 30 by lock nut 34, and the support 33 is held on nut 31 by lock nut 35.

The spring holders 32 and 33 are bifurcated as indicated at 36 and 37 and receive the prongs 39 and 40 of the spring 38 which is bifurcated at its ends. The spring 38 is shown as a laminated leaf or bar spring, but it may have any other suitable form, and may be composed of as many laminations as desired to give it the required stiffness or flexibility and strength. It will be observed that the ends of spring 38 are loosely supported at their ends in the spring holders 32 and 33 so that the ends are free to move axially in the spring supports.

The armature assembly comprises a bar 41 built up of laminated plates which are held in assembled relation between the angle plates 42 and 43 by means of rivets 44 passing therethrough. A motion transmitting or connecter member 45 is secured to the angle plates 42 and 43 in spaced relation to the armature bar 41 in any suitable manner, as by welding thereto, and the assembly comprising the armature 41, angle plates 42 and 43, and motion transmitting member 45 are secured to the spring 38 by a recessed clamp bar 46 and bolts 47 passing through the clamp bar and threaded into the motion transmitting member 45 and angle plates 42 and 43.

In the preferred form shown, the motion transmitting member 45 is angle shaped and is bolted to a plate 50 welded to the bottom adjacent the open end 51 of the conveyor trough 52. The opposite closed end 53 of the conveyor trough 52 has a bracket 54 welded or otherwise secured thereon to which is suitably bolted one end of a leaf spring 55, the other end of the spring being suitably bolted to a bracket 56 which may be integral with the base 1. The spring 55 supports and guides one end of the conveyor trough so that it will be capable of vibratory motion. However, it will be understood that the rear end of the trough may be mounted for approximately horizontal movement in any other suitable manner.

Figure 6:
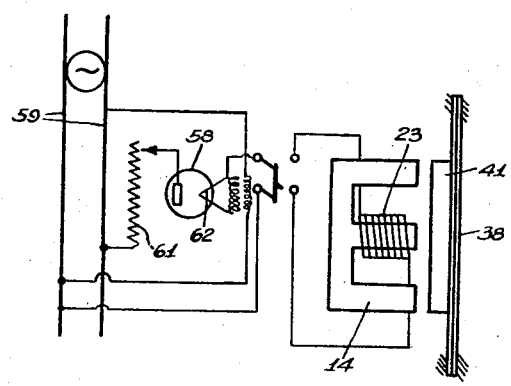
Figure 6 is an electrical wiring diagram with an electric motor schematically shown.

Referring to Figure 6, wherein a preferred operating circuit is shown, the thermionic valve 58 is connected into any suitable alternating current circuit represented generally by the numeral 59, which may be a commercial power line carrying alternating current, for example at frequencies of 25, 30, 50 or 60 cycles per second, in such a way that unidirectional pulsations of current separated by a time interval of zero energy pass through the rheostat 61, and through the thermionic valve 58 allowing current to flow therethrough in one direction only. The cathode 62 of the thermionic valve may be heated by current supplied from any suitable source, such as the alternating current source 59. It will be understood that in place of the thermionic valve 58 any suitable rectifier, such as valves of the dry disk, mercury and electrolytic type may be used.

The operation of the apparatus so far described now will be explained. When a pulsating current is passed through coil 23 the electromagnetic force set up in the magnet 14 attracts the armature 41 against the resilient resistance of springs 38 and 55, and when the current wave dies down sufficiently the inertia of the moving parts continues the motion until the built up restoring force in the springs gradually reverses the motion and retracts the armature and thus moves the trough 52 which is connected thereto. On continued flow of current through the solenoid a vibratory motion of the armature and spring is set up, which moves the trough 52 with a vibratory motion, and any material placed on the trough, such as sand, powder, or articles of any kind, will be conveyed continuously in one direction. The vibration absorbers 5 are so selected with respect to the mass of the base 1 that the base and absorbers have a free vibration period equal to the natural period of the conveyor mounting whereby the vibration amplitude of the conveyor is greatly increased. The vibration absorbers thus are tuned to utilize reactive forces in the base to assist the conveyor action.

The natural periodicity of the conveyor mounting preferably is sub-synchronous to the recurrence period of the electromagnetic impulses, so that the conveyor at all times responds to the electromagnetic impulses. The rate of feed of the conveyor therefore can be quickly changed by adjustment of the rheostat 61 which governs the current supplied to the solenoid 23 of the motor and thus governs the amplitude of vibration thereof.

Figure 2:
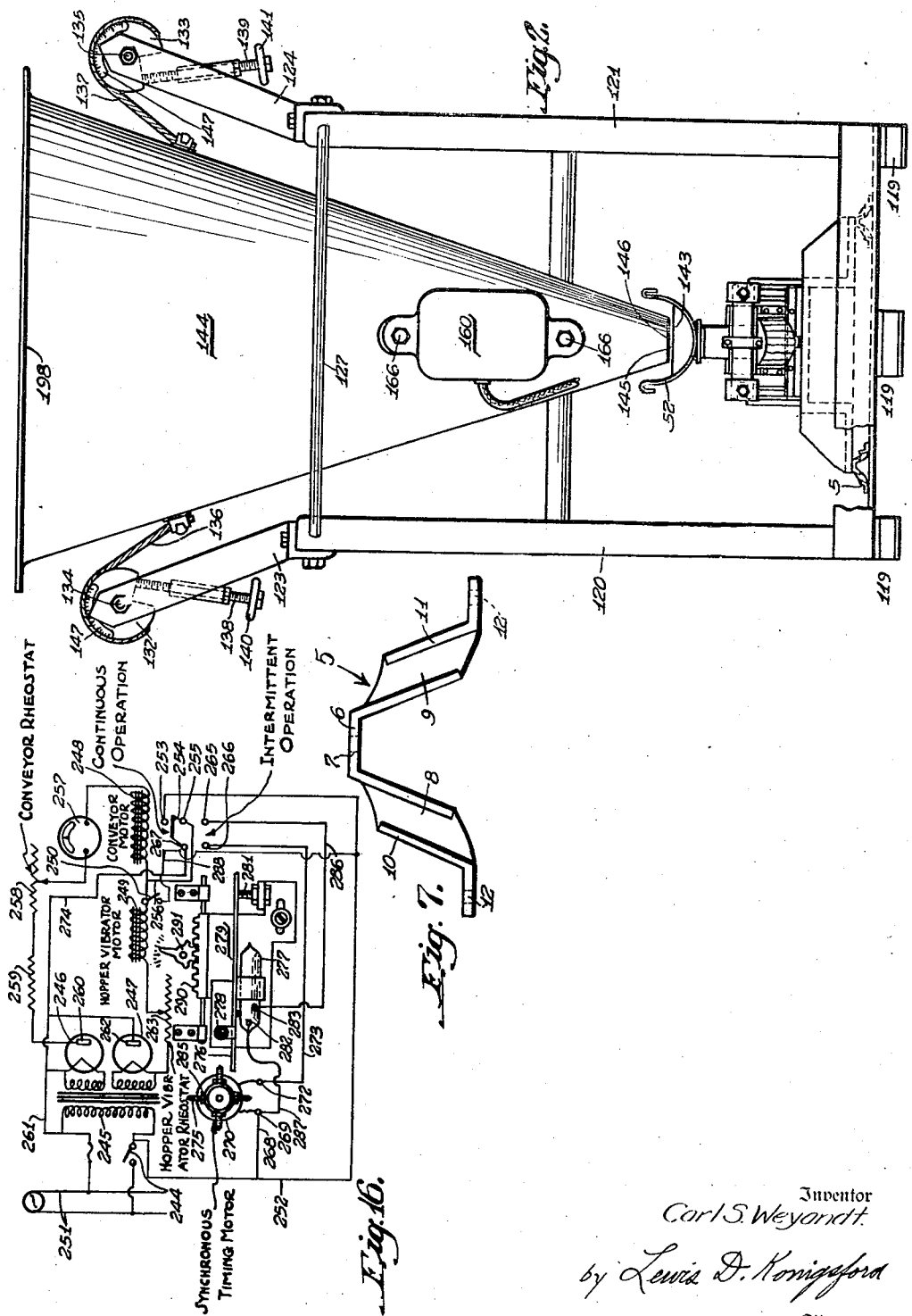
Figure 2 is an end view, looking in the direction of the arrow II in Figure 1.

Referring to Figures 1 and 2, a frame designated generally by the numeral 116 is made up of angle bars welded or otherwise suitably secured together. The bottom of the frame is made of four angle bars 117 with one face 118 turned inward and the other face vertical, and the conveyor base 1 is suitably supported on the inwardly turned faces 118 thereof. The conveyor base 1 is set on the vibration absorbers 5, of which any desired number may be employed, so that the vibrations of the base 1 are not transmitted to the frame 116. The frame 116 is also set upon vibration absorbers 119 which are like the vibration absorbers 5, and serve to prevent vibrations in the floor from affecting the frame or the members supported thereon.

The frame 116 has two pairs of side members 120 and 121 which have cross pieces 122 at their upper ends, and support the hopper brackets 123 and 124 thereon. As the two hopper brackets are constructed alike only one will be described in detail. The bracket 124 has an inverted L-shaped foot which is bolted to the cross piece 122 at the top by bolts 125 and at the sides by bolt 126. A curved bar or pipe 127 connects the two side members 120 and 121 of the frame to provide a re-enforcement for the top portion thereof. To the upright part of the hopper bracket 124 is welded or otherwise secured, the inclined internally threaded sleeve 131. Segmented grooved pulleys 132 and 133 are rotatably journalled on bolts 134 and 135 passing through suitable transverse holes in the upper ends of bars 129 and 130, and cables 136 and 137 are secured to the respective pulleys at one end thereof by suitable clamps, the other ends thereof being clamped to the wall of conical hopper 144. Adjustment screws 138 and 139 are threaded through threaded sleeves 131 with their ends abutting one segmental face of the pulleys 132 and 133 respectively. The other ends of screws 138 and 139 carry hand wheels 140 and 141. As shown in Figure 2, the conveyor trough 52 has a rounded bottom, and I prefer to provide a suitable table or platform 143 near the closed end of the trough. It will be apparent that the hopper 144 is supported by the cables 136 and 137 with its smaller end over the table 143, and it will be apparent that by rotating pulleys 132 and 133 the hopper may be raised or lowered with respect to the table 143. The space 145 between the end 146 of the hopper and the table 143 constitutes a controllable feed opening, which may be varied by varying the hopper with respect to the table. The ends of the bars 129 and 130 may be pointed to co-operate with suitable graduations 147 on the pulleys to insure correct adjustment thereof.

It will be understood that where a chute having a flat bottom is used the table 143 may be omitted and the lower end 146 of the hopper may co-operate with the bottom of the trough. Material is introduced into the hopper 144 at its larger end 148 and is discharged from the hopper onto the conveyor trough 52 through the feed opening 145 choked by the material being fed from the hopper, the conveyor acting as a vibratory gate to control the discharge therefrom and the reciprocations of the conveyor chute 52 carry the material along and discharge it from the open end thereof in a continuous stream into any suitable tank or receptacle. The feed opening 145 provided between the hopper and conveyor may be adjusted as desired, as for example, for materials having different angles of repose respectively, by relative positioning of the hopper and conveyor.

A clevis block 150 secured to the hopper has a bolt 151 therein about which is located a grooved rubber grommet 152, one looped end of rod 153 being swivelled about this grommet 152. A clevis bracket is welded or otherwise secured to the cross piece 155 of the frame 116. The adjustment handle 156 is in the form of a U and a bolt 157 passing through the base of the U and through the clevis bracket 154 serves as a pivot for the handle 156. A second grommet 158 is located on a bolt 159 passing through the arms of the U handle 156, and the other end of rod 153 is looped over the grommet 158. A nut on the end of bolt 157 clamps the handle 156 in adjusted position. By means of this construction, by pivoting the handle 156 about its axis 157 the hopper may be tilted from the vertical as desired to adjust the feed opening 145 from the end or from the top surface of table 143. The clevis bracket 154 is calibrated, and the index mark on the handle 156 co-operates therewith to insure correct setting of the hopper.

From the foregoing description it will be apparent that the hopper 144 is substantially insulated from the frame 116 so as to practically prevent the transmission of vibration from the hopper to the frame. The rubber grommets 152 and 158 prevent the transmission of vibration through rod 153 to the frame, and the cables 136 and 137 prevent the transmission of vibration to the hopper supports and thence to the frame. Similarly, the vibration absorbers 5 prevent the vibrations of base 1 from being transmitted to the frame 116 and thence to the hopper 144, and the vibration absorbers 119 insulate the whole apparatus from any external vibration interference.

To overcome any tendency of the material in the hopper 144 to form a bridge or clog the hopper, I provide a vibrator designated generally by the numeral 160 which has a base 161 of cast steel or other suitable material and has a thickened central body portion or rib 162 and integral flanges 163 and 164, bolt holes 165 being bored through the ends of the base 161 through which pass the bolts 166 by which the vibrator is secured to a plate 167 bolted onto the wall of the hopper 144. A rectangular opening 168 is formed centrally of the base 161 and receives a laminated electromagnet core 169 substantially in the shape of an inverted T. The core 169 is secured to the base 161 by cutting the base in half on its long axis, inserting the core 169 in place, and riveting the two halves and the core together by rivets 170 passing through the core and central rib 162. The two halves of the base then are reunited by welding. In this way a very rigid structure is built up in which the magnet core 169 is securely held to the base 161.

A cushioning pad 171 of rubber or other suitable material is placed on the base over the core 169, the core being surrounded by a layer of insulation fabric 172, and a coil 173 of insulated wire wound horizontally surrounds the leg of the core. A pair of clips 174 suitably insulated from the coil are bolted to the base 161 to hold the wire coil 173 securely in place on the base. Adjacent each end of the base are two supports for the armature indicated generally by the numerals 175 and 176. As these supports are alike in construction, only one of them will be described in detail. The supporting member 175 comprises an inverted channel shaped metal strip 177 with a hole 178 bored centrally therethrough, and resilient members which preferably are non-magnetic are secured thereto. The preferred construction of resilient members comprises rubber pads 179 and 180 vulcanized or otherwise suitably secured to each side of the channel strip 177. The pads are right and left hand and the faces thereof are substantially parallel, the ends being cut in the form of an arc. Angle strips 181 and 182 are vulcanized to the opposite faces of the pads, and are bolted to the base 161 by bolts 183 thereby holding the armature supports securely in place at opposite ends of the core 169.

The armature 184 is of laminated construction and is substantially in the shape of a C on its side. The laminated plates of the armature 184 are enclosed by thicker side plates 185 and 186 on either side which extend part way along the legs of the C and beyond the armature proper, all the plates being held in assembled position by suitable rivets 187. Cross bars 188 at each end having bolt holes 190 therein are positioned between the side plates 185 and 186 and are welded thereto, and the armature assembly is secured to the resilient members 175 and 176 by bolts 194. Spacing washers 195 are interposed between the horizontal bars 188 and 189 and the tops of the channel members 177 to space the armature a suitable distance to provide an air gap from the end of core 161, and the nuts 191 hold the armature, spacers and channel members in assembled position. By reason of the non-magnetic properties of the armature supports 175 and 176, the possibility of the electromagnetic flux being shunted around the air gap into the armature is eliminated. This vibrator is described and claimed in my Patent Number 2,206,244, issued July 2, 1940.

The vibratory mass, which term includes the armature 184 and the vibratory portions of supports 175 and 176 has a period of vibration out of resonance with the electromagnetic impulse, whereby it vibrates with a differential motion, and I prefer to construct the pads 179 and 180 so that the vibratory mass has a period of about two-thirds to eleven-twelfths that of the electromagnetic impulse, the exact relation depending on the nature of the pulsating current and the amount of differential motion desired.

Ordinarily, when the armature is vibrating, the amplitude of its vibration is such that the heads of bolts 194 do not strike the base 161, and the armature 184 does not strike the electromagnet core 169. However, the vibration may be adjusted to a greater amplitude, if desired, by increasing the voltage supplied to the coil 173 so that the vibrator operates on the impact principle, or the bolts 194 may be adjusted to bring their heads closer to the base 161 so that they will strike the base. Two surfaces 192 of "Stellite" or similar hard preferably non-magnetic material are welded in suitable depressions to the case steel base in line with the bolts 194 so that the heads of bolts 194 will strike these surfaces under such conditions. The heads of bolts 194 also may be coated with "Stellite" or similar material if desired.

The non-magnetic contact surfaces 192 and the "Stellite" coating on the heads of bolts 194, if used, also prevent or limit shunting of the magnetic flux under conditions of operation where impact occurs.

The vibrator 160 is located a suitable distance from the smaller end 146 of the hopper so that the vibrations of the hopper are substantially uniformly distributed about its periphery at the smaller end, this action being assisted by the top flange 198 of the hopper which increases the rigidity of the larger end and forces the vibrations toward the smaller end. The conveyor table or platform 143 vibrates across the open mouth 146 of the hopper 144 and moves material through the feed opening 145 onto the conveyor trough, the vibrator 160 meanwhile maintaining the material in the hopper in a state of flux so that it responds to the feeding movements of the conveyor trough. The vibratory motion feeds the material toward the open end of the conveyor in a continuous stream. Due to the axis of vibration of the armature being at an angle to the bottom of the conveyor, the action I believe is one of successively rapidly withdrawing the conveyor from under the particles of material in one direction and more slowly returning the conveyor to pick up the particles of material at a different point thereon and move them ahead. The rate of feed of the conveyor can be adjusted for materials of various natures by rotating the adjustment screws 138 and 139 to raise or lower the hopper with relation to the conveyor table 143 and thus adjust the feed opening 145. The feed opening can also be adjusted by loosening bolt 157 and moving handle 156 to change the inclination of the hopper axis and thus change the size of the feed opening 145. The adjustment provided by handle 156 is particularly advantageous in handling fine materials, such as activated carbon, which have a tendency to flush. In handling such materials the hopper is set close to plate 143 and is then pushed forward by handle 156 beyond the forward edge of table 143, so that if the material starts to flush the hopper may be retracted by handle 156 to stop the flush then gradually return the hopper to the desired working position.

The hopper being supported by the frame 116, the conveyor trough 52 carries only a small part of the load of material therein. Any increase in the load on the conveyor trough has the tendency to load the springs 38 and 55 and thus bring the armature 41 closer to the magnet 14 to decrease the air gap and thus increase the power of the electromagnet, which may automatically compensate for change in load and thus maintain the rate of feed substantially uniform under varying conditions of load. The rate of feed of the conveyor can be adjusted by means of the hopper adjustment, or by change in the amplitude of vibration of the conveyor motor which occurs with change in current supplied thereto, an increase in amplitude increasing the rate of feed.

Figure 12:
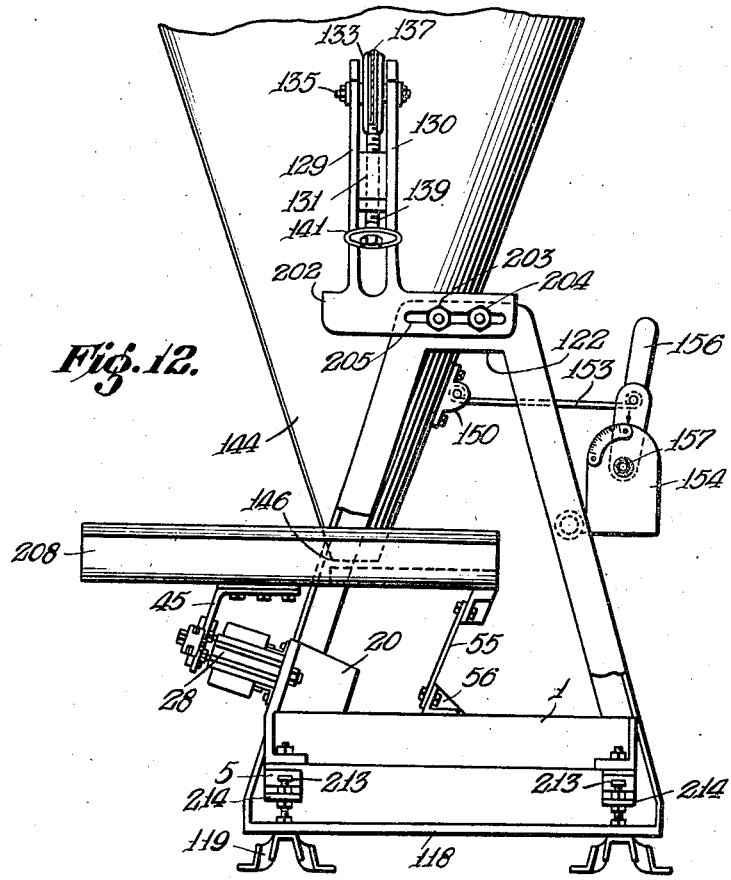
Figure 12 is a fragmentary view of a modification of the hopper and conveyor mounting shown in Figure 1.

In the modification shown in Figure 12, wherein corresponding parts receive the same numerals, I provide an arrangement whereby the hopper is also horizontally adjustable. In this construction L-plate extensions 202 are bolted to the cross pieces 122 of the side members 120 and 121 of the frame by bolts 203 and 204 passing through slots 205 therein. The upright bars 129 and 130 are welded or cast integral with the L plates 202. By this construction the L-plate extensions 202 may be horizontally adjusted on the frame cross pieces 122. A modified form of conveyor trough 208 is preferably used in connection with this modification and has a long table 209 so as to provide a wide range of adjustment. This modification, in which the distance between the open end of the conveyor trough and the hopper is shortened is particularly suitable for feeding deliquescent chemicals which tend to cake and are therefore difficult to feed in small or uniform quantities. This adjustment also allows a variation of the rate of feed of the conveyor. The rate of feed of the conveyor depends, among other factors, on the distance from the end of the conveyor to the hopper and the depth of material thereon, and by varying the hopper location along the conveyor trough one of the factors controlling the rate of feed, namely, the distance from the end of the conveyor to the hopper, is varied.

Figure 13:
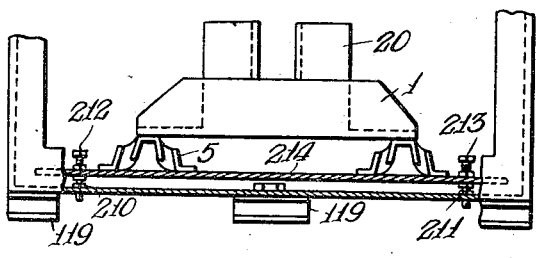
Figure 13 is a partially sectional front view of the conveyor adjustment shown in Figure 12.

Referring to Figures 12 and 13, there are holes 210 and 211 threaded into the lower bar 118 of the frame 116, and screws 212 and 213 are threaded into these holes and locked in position by suitable lock nuts. Each end of the conveyor base 1 resting on vibration absorbers 5 is secured to a bar 214 which slidably receives the screws 212 and 213 and is held in position thereon by suitable lock nuts. It will be apparent that each end of the conveyor base 1 and with it the conveyor trough 208 can be elevated as desired by suitable adjustment of the lock nuts holding the bar 214 in position to regulate the size of the feed opening, or to change the inclination of the trough up or down hill.

In Figure 16 I have shown an electrical diagram for continuously or intermittently operating the vibratory conveyor, the hopper vibrator and conveyor motor preferably being operated by complementary half waves of a rectified alternating current source. Upon closing the filament excitation switch 244, the primary coil of heater transformer 245 receives current from any suitable alternating source, which may be commercial power lines 251, the filaments of the thermionic valves 246 and 247 being heated by the secondary coils of the transformer, the cathodes and anodes of tubes 246 and 247 being interconnected to produce two series of direct current impulses. The conveyor vibratory motor is designated by the inductance 248, and the hopper vibrator motor by the inductance 249. One half wave of circuit is through switch 244, lead wire 252 to the terminal 253 of switch 254. When it is desired to operate the vibratory conveyor and hopper motor continuously the switch 254 is thrown to connect terminals 253 and 255 and switch 250 is opened, the current wave passing by lead 256 through inductance 248, through the ammeter 257, the rheostat 258 and fixed resistance 259 through the anode 260 of the thermionic valve 246. This thermionic valve only allows one half wave to pass therethrough. The other half wave circuit is through the lead wire 261, through the anode 262 of the thermionic valve 247, thence through calibrated rheostat 263 and inductance 249, by lead 256 to switch contact 255, thence through switch 254 to contact 253 and through wire 252 and switch 244 back to power wire 251.

When it is desired to operate the reciprocatory conveyor intermittently, the switch 254 is moved to contact terminals 265 and 266. In this position of the switch, the current circuit is through lead 252 and lead 268 to the terminal 269 of the synchronous motor 270; and from the other terminal 272 thereof through lead 273 to the switch contact 266, through the switch 254 to terminal 267 and from thence by leads 274 and 261 to the power wire 251 of the alternating current source. The synchronous motor 270 therefore is in continuous operation at an accurate chronometric speed in this position of the switch.

The synchronous motor 270 drives a timing member shown diagrammatically having a plurality of projecting threaded switch actuator pins 275, shown as four in number. However, any desired number of actuator pins may be employed. The actuator pins 275 are adapted to engage a support 276 for a mercury switch 277 which is pivotally supported at 278 on a panel 279, and when an actuator pin 275 engages the end of support 276 the support is tilted downward, thus causing the mercury to flow to the left and establish communication between the electrodes 282 and 283 of the mercury switch. When the actuator pin 275 passes the supports 276 the weight of the support returns it to the position shown resting on the adjusting screw 281. The actuator pins 275 may be adjusted to compensate for wear by loosening lock nut 285 thereon, threading the actuator into or out of the supporting ring as desired, and again tightening the lock nut.

In the position of the mercury switch 277, shown in Figure 16 and with switch 254 in intermittent operation position, the mercury switch is open and no current flows through the inductances 248 and 249. When the mercury switch is in tilted position one half wave flows from the rectifier tube 247 through rheostat 263, inductance 249 to switch terminal 255 and through the switch 254 to terminal 265, thence through lead wire 286 to electrode 283, through the mercury to electrode 282, thence by lead wires 287, 268 and 252 to the main conduit. Similarly, the other half wave circuit is from main conduit 251, through leads 252, 268 and 287 to the mercury switch 277 thence by lead 286 to the switch 254, and thence through lead 256 to inductance 248 and ammeter 257 to rectifier tube 246.

As long as the actuator pins 275 maintain the switch support 276 in tilted position alternate half waves of rectified current will flow through the inductances 248 and 249 to operate the reciprocatory conveyor and the hopper vibrator respectively. As there are four actuator pins 275 and if the synchronous motor 270 rotates them once in each minute, there will be four periods of operation of the vibratory conveyor and hopper vibrator and four periods of idleness in every minute. The duration of each period of operation can be determined by sliding the panel 279 horizontally so as to govern the distance by which support 276 extends into the path of the actuator pins 275. The further this support extends into the actuator pin path the longer will be the operative periods of the conveyor and hopper vibrator. Preferably, the timing is such that the circuit is opened during periods of zero current. Thus in the case of a sixty cycle alternating current, if the interruption occurs four times per minute it will be after the fifteenth, thirtieth, forty-fifth and sixtieth pulsation in that particular minute. The calibration means for the switch comprises a rack 290 and a gear wheel 291 in mesh therewith and carrying an indicator which shows the position of the switch support with relation to the actuators in time units of contact.

If desired, the hopper vibrator may be operated continuously and the conveyor motor operated intermittently. This is accomplished when the switch 254 is moved to intermittent operation position and switch 250 is closed. With this arrangement current flows continuously through the hopper vibrator motor circuit comprising anode 262, rheostat 263, inductance 249, switch 250, lead wire 288 and lead wire 252. The operation of the conveyor motor is as previously described with the switch 254 in intermittent operation position.

In operating the feeder machine, the line switch 244 is first closed to heat the filaments of the thermionic tubes 246 and 247, the switch 254 is thrown to the desired position, and switch 250 is also thrown to open or closed position as desired. The amplitude of vibration of the conveyor is governed by adjustment of the rheostat 258 which governs the current supplied to the coil of the conveyor motor, and the amplitude of vibration or force of vibration of the hopper vibrator is governed by adjustment of the rheostat 263 which preferably is calibrated. The ammeter 257, which indicates the setting of the rheostat 258 may be calibrated to show the rate of feed in units of weight or volume per unit of time. The continuous operation system is utilized for all rates of feed of certain materials which are easily handled, and the intermittent operation system is utilized principally for very low rates of feed below the rate at which a continuous feed can be maintained at a uniform rate. For example, a machine built according to the modification shown in Figure 1 is capable of feeding at the rate of a few ounces per hour up to several thousand pounds per hour, depending on the nature of the material being handled. This universal ability of the machine is illustrated in the following table of rates of feed for a given machine:

| Material | Per hr. min. rate | Per hr. max. rate |
| --- | --- | --- |
|  | Pounds | Pounds |
| Sand | 1 | 10,000 |
| Pebble lime | 2 | 4,000 |
| Alum | ½ | 800 |
| Soda ash | ½ | 600 |
| Activated carbon | ½ | 100 |

The above ratings are conservative and the feeder machine may be operated in many instances below the above minimum rates or above the maximum rates, and may be operated at any desired rate of feed between the above limits.

When it is desired to operate the feeder machine at an intermittent rate, the calibration means 291 is set for the desired duration of operation, and the switch 254 is thrown to the intermittent operation position so as to operate the conveyor motor and hopper vibrator motor intermittently for the desired duration as determined by the setting of calibration means 291. In the case of some materials that are difficult to handle, it may be desired to operate the hopper vibrator continuously, and the conveyor intermittently, and for this purpose the switch 250 is closed. It also will be understood that any of the various modifications herein disclosed may be incorporated in one machine. The intermittent operation of the apparatus is claimed in my application Serial Number 460,739, filed October 5, 1942, for Method and apparatus for conveying materials.

Figure 14:
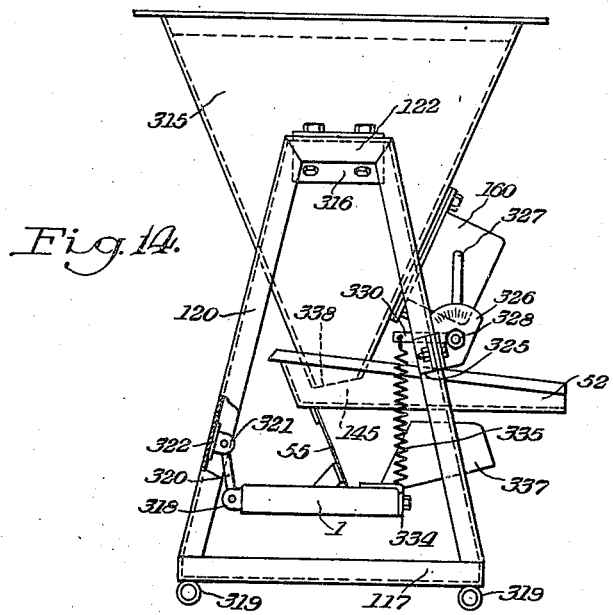
Figure 14 is a side view of a further modification.
Figure 15:
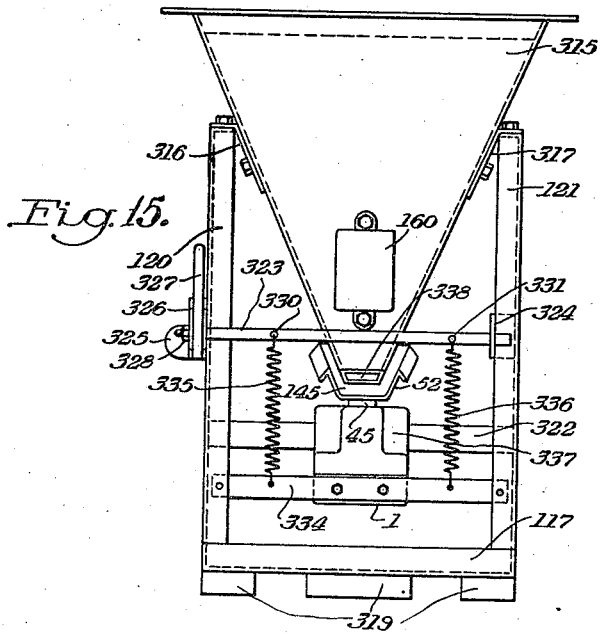
Figure 15 is an end view of Figure 14.

In the modification shown in Figures 14 and 15, the hopper 315 which may be of inverted pyramidal form, has angle plates 316 and 317 secured to its sides by which the hopper is bolted to the horizontal bars 122 of the frame members 120 and 121. Vibration absorbers 319 may be secured to the base 117 of the frame, these vibration absorbers being formed from rubber hose lengths and suitably bolted to the frame.

The base 1 of the conveyor has a clevis 318 secured to its rear end to which is pivotally secured one end of a link 320, the other end of the link being pivoted in a clevis 321 suitably secured to a bar 322 welded to the frame members 120 and 121. A round bar 323 is journalled at one end in a suitable hole in supporting angle bracket 324 secured to the frame member 121. A similar angle bracket 325 on the other frame member 120 has a U-shaped bracket 326 secured thereto which contains a handle 327 suitably pinned to rod 323 to rotate therewith, and a nut 328 on the threaded end of rod 323 clamps the handle in adjusted position. Rods 330 and 331 are threaded into suitable holes in rod 323 to extend rearwardly thereof.

The front end of base 1 has a bar 334 bolted thereto and coil springs 335 and 336 are secured to bar 334 at their lower ends and to rods 330 and 331 respectively at their upper ends.

Figure 3:
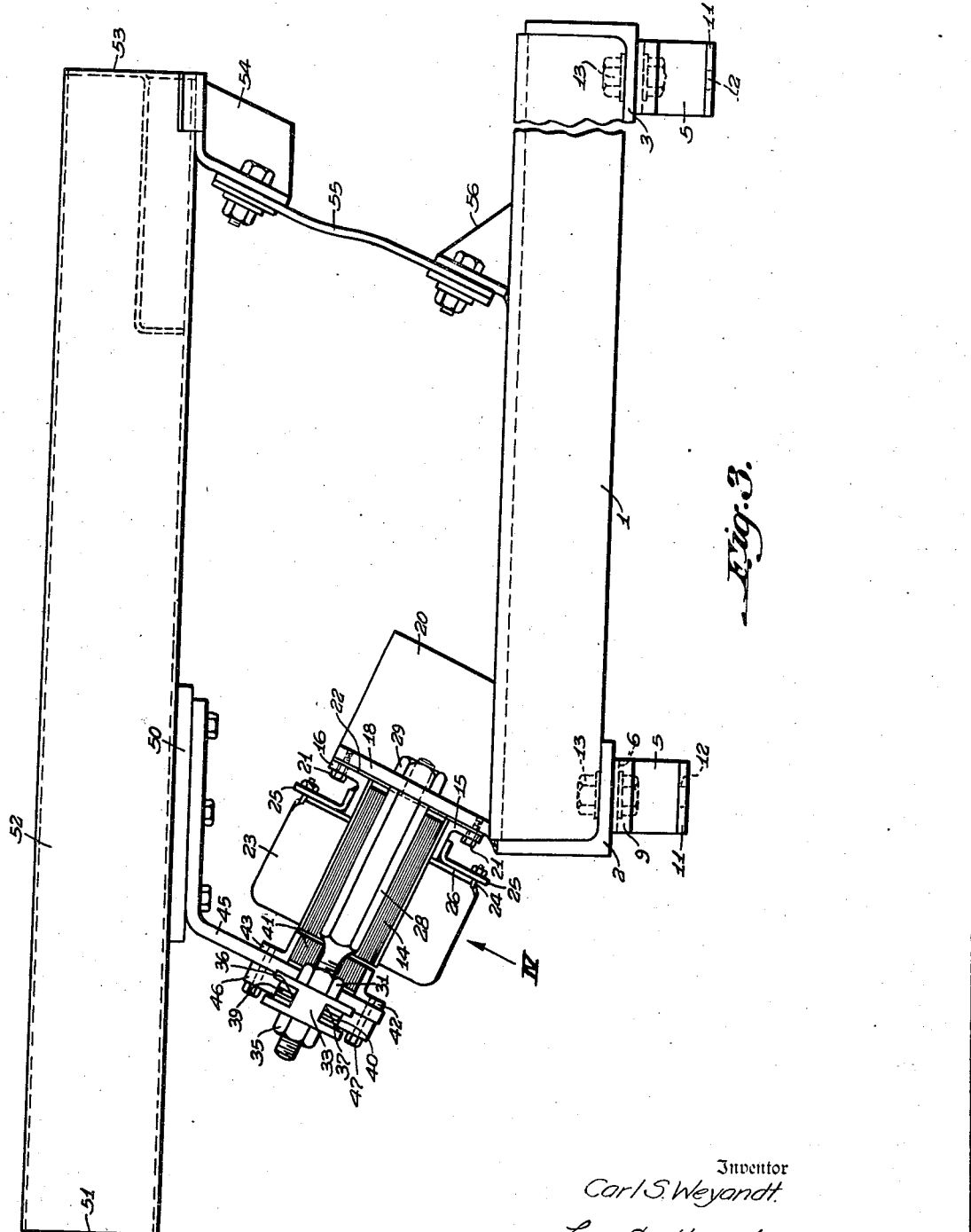
Figure 3 is a side elevation of a conveyor employed in the embodiment shown in Figures 1 and 2.
Figure 4:
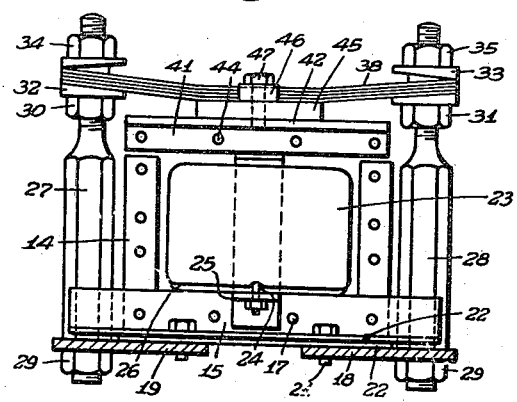
Figure 4 is a bottom view of the conveyor motor looking in the direction of the arrow IV in Figure 3.
Figure 5:
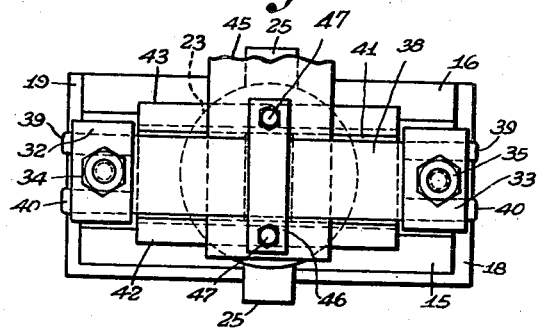
Figure 5 is a plan view of Figure 4.

The base 1 carries a conveyor trough 52 on a rear cantilever spring 55 and a front reciprocating motor constructed as shown in Figures 1 to 3, which is enclosed in a housing 337, and the conveyor assembly thus is pivotally secured at the rear end to the frame members 120 and 121, and at the front is suspended by springs 335 and 336. Vibrations of the base 1 therefore are not transmitted to the frame. The natural period of the springs 335 and 336 is adjusted to assist the conveying action.

The mouth of hopper 315 is cut off at an angle to the horizontal, as indicated at 333, and thus provides a feed opening 145 between the hopper wall and the conveyor trough. This feed opening may be varied by changing the relation of the conveyor trough to the hopper, as by changing the inclination of the trough to the horizontal. This adjustment is accomplished by turning handle 327, which rotates bar 323 carrying supporting springs 335 and 336 at the ends of rods 330 and 331 to raise or lower the front end of the conveyor, and the handle may be locked in adjusted position by nut 328. The range of adjustment provided may be preferably a declination of ten degrees and an inclination of ten degrees, making a total adjustment of twenty degrees. However, any other range of adjustment desired may be provided. This adjustment enables a large variation in the rate of feed of the conveyor and also enables the conveyor to be adjusted to feed downhill or uphill. This adjustment also is of advantage in handling materials having a tendency to flush, for the conveyor may be adjusted upward to provide a small feed opening with the hopper and then adjusted downwardly to provide the desired working position.

As the invention may be embodied in other specific forms without departure from the spirit or essential characteristics thereof, the present preferred embodiments are therefore to be considered as illustrative rather than restrictive of the invention.

What is claimed and desired to be secured by United States Letters Patent is:

1. In a vibratory feeder machine, a substantially horizontal vibratory conveyor having a substantially flat portion, a hopper to hold a supply of material over the conveyor, said hopper having an opening in a substantially horizontal plane adjacent and substantially parallel to said flat portion of said conveyor whereby accumulation of material on the conveyor blocks the feed opening, and means to tilt the axis of the hopper to change the plane of the feed opening and adjust the feed opening therebetween, and means to vibrate said conveyor across the hopper mouth in a substantially horizontal plane.

2. In a vibratory feeder machine, a substantially horizontal vibratory conveyor, a hopper to hold a supply of material over the conveyor, said hopper having an opening in a substantially horizontal plane adjacent said conveyor whereby accumulation of material on the conveyor blocks the feed opening, and means to move the hopper horizontally along the conveyor to vary the rate of feed of the conveyor.

3. In a vibratory feeder machine, a vibratory conveyor, a hopper having an open end supported over the conveyor to provide a feed opening therebetween, means to elevate or lower the hopper with relation to the conveyor, calibrated means to tilt the hopper, and means to move the hopper horizontally to regulate the feed thereof.

4. In a feeder machine, a frame, a hopper having an open end suspended therefrom by vibration absorbing flexible suspension means, a reciprocatory conveyor mounted to reciprocate across the opening of the hopper, said conveyor having a flat portion at the hopper opening acting as a vibratory gate, and means to adjust said hopper suspension means to govern said opening between the hopper and conveyor.

5. In a vibratory feeding apparatus, a vibratory conveyor supported for operation, a support, a pair of sheaves rotatably mounted on said support, vibration absorbing flexible suspension means secured at one end to said sheaves, a hopper secured above said conveyor and to the other end of said means, and screw means engaging said sheaves for rotating the same to extend or shorten said suspension means.

6. In a vibratory feeding machine, a support, a hopper adapted to contain material supported by said support, a conveyor supported beneath said hopper to receive material from said hopper, an electromagnetic conveyor motor connected to said conveyor for vibrating the same, an alternating current circuit for said conveyor motor, a self-contained electromagnetic reciprocatory vibrator connected to said hopper for vibrating the same, an alternating current circuit for the hopper vibrator, and means in the hopper vibrator portion of the circuit for varying the current supplied to said hopper vibrator for controlling said vibrator separately from the conveyor motor.

7. In a vibratory feeding machine, a support, a hopper adapted to contain material supported by said support, a conveyor supported beneath said hopper to receive material from said hopper, an electromagnetic conveyor motor connected to said conveyor for vibrating the same, a self-contained electromagnetically reciprocatory vibrator secured to said hopper for vibrating the same, an alternating current circuit including means for separating the alternating current into complementary half waves connected to operate the hopper vibrator and conveyor motor respectively, and means in the hopper vibrator portion of said circuit for varying the current supplied to said hopper vibrator separately from the current supplied to the conveyor motor.

CARL S. WEYANDT.